(12) United States Patent
Dussault et al.

(10) Patent No.: US 10,526,961 B2
(45) Date of Patent: Jan. 7, 2020

(54) ROTARY INTERNAL COMBUSTION ENGINE WITH UNEQUAL VOLUMETRIC RATIOS

(71) Applicant: PRATT & WHITNEY CANADA CORP., Longueuil (CA)

(72) Inventors: Serge Dussault, Ste-Julie (CA); Andre Julien, Ste-Julie (CA); Michael Lanktree, La Prairie (CA); Edwin Schulz, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 288 days.

(21) Appl. No.: 15/428,303

(22) Filed: Feb. 9, 2017

(65) Prior Publication Data
US 2018/0223728 A1     Aug. 9, 2018

(51) Int. Cl.
| | |
|---|---|
| *F02B 55/14* | (2006.01) |
| *F02B 53/00* | (2006.01) |
| *F01C 11/00* | (2006.01) |
| *F01C 20/18* | (2006.01) |
| *F02B 55/02* | (2006.01) |
| *F02B 55/08* | (2006.01) |
| *F02B 53/08* | (2006.01) |
| *F01C 1/22* | (2006.01) |
| *F01C 21/08* | (2006.01) |
| *F01C 21/00* | (2006.01) |

(52) U.S. Cl.
CPC ............... *F02B 55/14* (2013.01); *F01C 1/22* (2013.01); *F01C 11/008* (2013.01); *F01C 20/18* (2013.01); *F01C 21/0809* (2013.01); *F02B 53/08* (2013.01); *F02B 55/02* (2013.01); *F02B 55/08* (2013.01); *F01C 2021/125* (2013.01); *F01C 2021/1606* (2013.01); *F02B 2053/005* (2013.01)

(58) Field of Classification Search
CPC .. F02B 55/14; F02B 2053/005; F01C 11/002; F01C 11/008; F01C 20/18; F01C 21/18; F01C 11/004; F01C 11/006
USPC .................................................. 60/201.1–249
See application file for complete search history.

(56) References Cited

U.S. PATENT DOCUMENTS

| | | | | |
|---|---|---|---|---|
| 3,236,213 A | * | 2/1966 | Motoaki | ................. F02B 53/00 123/213 |
| 3,941,522 A | | 3/1976 | Acord | |

(Continued)

FOREIGN PATENT DOCUMENTS

| | | |
|---|---|---|
| EP | 2551447 A2 | 1/2013 |
| WO | WO2013/017232 A2 | 2/2013 |

OTHER PUBLICATIONS

European Search Report dated May 25, 2018 in counterpart EP application No. 18156181.2.

*Primary Examiner* — Deming Wan
(74) *Attorney, Agent, or Firm* — Norton Rose Fulbright Canada LLP (57) ABSTRACT

A rotary internal combustion engine including a rotor assembly where at least a first and a second of the combustion chambers have unequal theoretical volumetric ratios. Also, a rotary internal combustion engine including first and second rotor assemblies where at least one of the combustion chambers of the first rotor assembly and at least one of the combustion chambers of the second rotor assembly have unequal effective volumetric compression ratios and/or unequal effective volumetric expansion ratios.

20 Claims, 4 Drawing Sheets

(56) References Cited

U.S. PATENT DOCUMENTS

| | | | | |
|---|---|---|---|---|
| 3,958,906 A | * | 5/1976 | Catterson | F01C 1/22 418/61.2 |
| 3,998,054 A | * | 12/1976 | Whitestone | F01C 1/104 60/517 |
| 4,091,789 A | * | 5/1978 | Jones | F02B 17/005 123/205 |
| 5,168,846 A | * | 12/1992 | Paul | F01C 20/16 123/202 |
| 5,537,973 A | | 7/1996 | Wittry | |
| 8,656,888 B2 | | 2/2014 | Thomassin et al. | |

\* cited by examiner

ROTARY INTERNAL COMBUSTION ENGINE WITH UNEQUAL VOLUMETRIC RATIOS

TECHNICAL FIELD

The application relates generally to rotary internal combustion engines and, more particularly, to volumetric ratios of such engines.

BACKGROUND OF THE ART

In order to increase power output per displaced volume of an internal combustion engine, one can increase the density of the air at the entry of the engine using a boost compressor. Since there is a limitation to the peak pressure that the engine can tolerate, it is common practice to decrease the volumetric compression ratio of the engine when high boost pressure is used. However the boost pressure that can be provided by the compressor is limited during start-up conditions, and the engine has to rely mainly on its own compression to provide sufficient pressure to light the fuel-air mixture; a small volumetric compression ratio thus impedes the performance of the engine assembly at start-up. The volumetric compression ratio must accordingly be selected to accommodate the conflicting requirements of limiting the peak pressure while providing sufficient pressure during start-up.

SUMMARY

In one aspect, there is provided a rotary internal combustion engine comprising: a housing having a rotor cavity; and a rotor received in the rotor cavity and cooperating with the housing to define combustion chambers in the rotor cavity, each of the combustion chambers having a respective working volume that is variable, each of the combustion chambers having a theoretical volumetric ratio defined as a ratio of a maximum value of the respective working volume to a minimum value of the respective working volume throughout one revolution of the rotor, wherein at least a first and a second of the combustion chambers have unequal theoretical volumetric ratios.

In another aspect, there is provided a rotary internal combustion engine comprising: an engine shaft; at least first and second rotor assemblies each including: a housing having a rotor cavity and having an inlet port and an exhaust port in communication with the rotor cavity, and a rotor engaged to the engine shaft and received in the rotor cavity, the rotor cooperating with the housing to define combustion chambers in the rotor cavity, each of the combustion chambers having a respective working volume, each of the combustion chambers having an effective volumetric compression ratio determined by a first variation in the respective working volume during a compression phase of the combustion chamber and by a position of the inlet port, and an effective volumetric expansion ratio determined by a second variation in the respective working volume during an expansion phase of the combustion chamber and by a position of the exhaust port; wherein at least one of the combustion chambers of the first rotor assembly and at least one of the combustion chambers of the second rotor assembly have one or both of unequal effective volumetric compression ratios and unequal effective volumetric expansion ratios.

DESCRIPTION OF THE DRAWINGS

Reference is now made to the accompanying figures in which.

DETAILED DESCRIPTION

Figure 1:
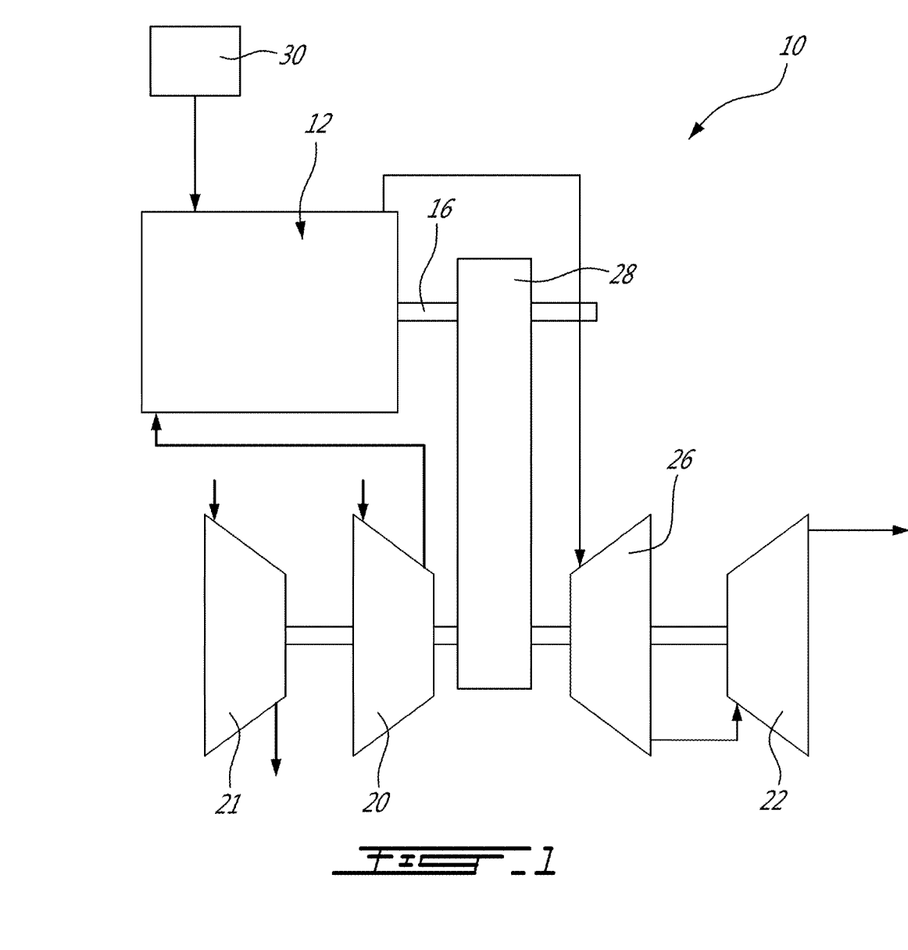
FIG. 1 is a diagram of an engine assembly in accordance with a particular embodiment.

Referring to FIG. 1, a compound engine assembly 10 which in a particular embodiment is used as an auxiliary power unit (APU) is generally shown. The engine assembly 10 generally includes a supercharger compressor 20 compressing the air to feed an intermittent internal combustion engine 12, and a load compressor 21 providing bleed air for the aircraft. Alternately, the supercharger compressor 20 may also act as the load compressor, i.e. both functions may be performed by a same compressor.

The exhaust from the engine 12 is fed to a compounding turbine section including one or more turbines 26, 22. One or more of the turbines 26, 22 is/are configured to compound power with the engine 12; in the embodiment shown, the turbine and engine shafts are coupled through a transmission provided by a gearbox 28. The compressor(s) 20, 21 are driveable by the engine 12 either directly or indirectly, i.e. the compressor(s) 20, 21 may be driven by the turbines 26, 22 and/or the engine 12. In the embodiment shown, the compressors 20, 21 are driven by the turbines 26, 22, for example by being coupled to the same shaft or being engaged to the turbine shaft through a transmission provided in the gearbox 28. In another particular embodiment, the shaft(s) of the compressor(s) 20, 21 is/are engaged to the output shaft 16 of the engine 12, either directly or through a transmission.

It is understood that the compound engine assembly 10 may have a different configuration than that shown in FIG. 1, including, but not limited to, the configuration of compound cycle engine system or compound cycle engine such as described in Lents et al.'s U.S. Pat. No. 7,753,036 issued Jul. 13, 2010, or such as described in Julien et al.'s U.S. Pat. No. 7,775,044 issued Aug. 17, 2010, or such as described in Thomassin et al.'s U.S. patent publication No. 2015/0275749 published Oct. 1, 2015, or such as described in Bolduc et al.'s U.S. patent publication No. 2015/0275756 published Oct. 1, 2015, the entire contents of all of which are incorporated by reference herein. The compound engine assembly 10 may be used as a prime mover engine, such as on an aircraft or other vehicle, or in any other suitable application.

Moreover, it is understood that the engine 12 may be used without the compressor section and/or without the turbine section. For example, the engine 12 may be used alone.

Figure 2:
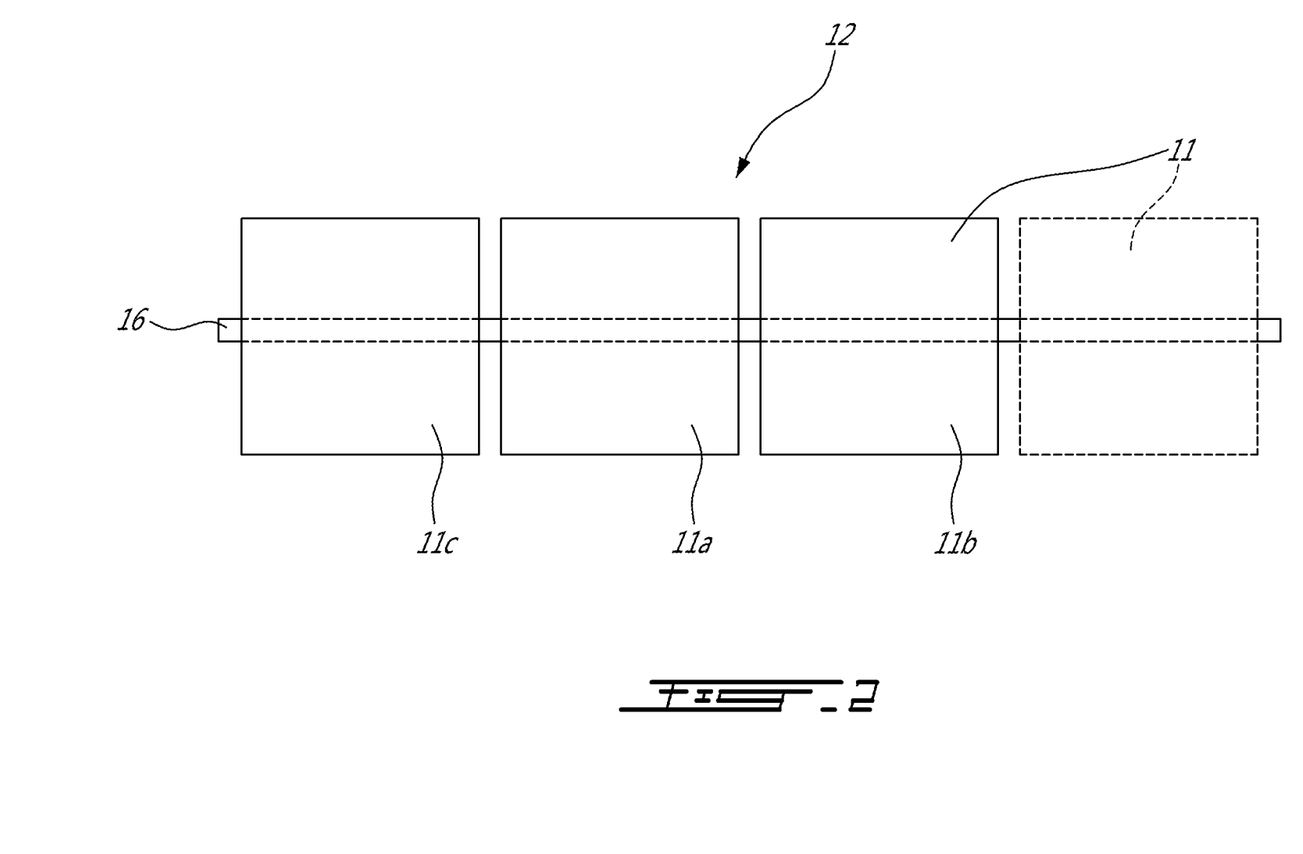
FIG. 2 is a diagram of an engine which may be used in the engine assembly of FIG. 1, in accordance with a particular embodiment.

Referring to FIG. 2, the engine 12 according to a particular embodiment is shown. In a particular embodiment, the engine 12 includes at least two (four in the embodiment shown) rotor assemblies 11 engaged to the output shaft 16. In a particular embodiment, the rotor assemblies 11 are configured as Wankel engines; it is however understood that other suitable types of internal combustion engine(s) may be used.

Figure 3:
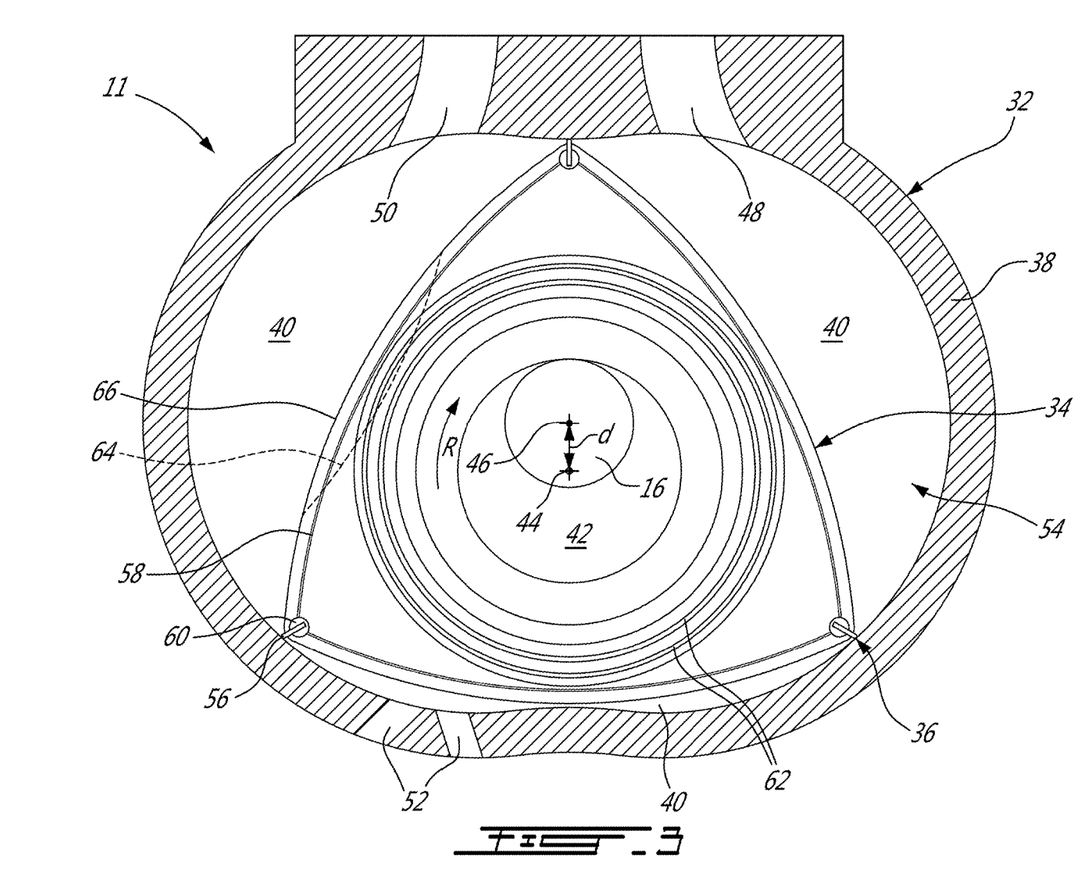
FIG. 3 is a schematic cross-sectional view of a rotor assembly which can be used in the engine of FIG. 2, in accordance with a particular embodiment.

Referring to FIG. 3, an example of rotor assembly 11 configured as a Wankel engine is shown. It is understood that the configuration of the rotor assemblies 11, e.g. placement of ports, number and placement of seals, etc., may vary from that of the embodiment shown.

The rotor assembly 11 comprises a housing 32 defining a rotor cavity having a profile defining two lobes, which is preferably an epitrochoid. A rotor 34 is received within the rotor cavity. The rotor in this embodiment defines three circumferentially-spaced apex portions 36, and a generally triangular profile with outwardly arched sides. The apex portions 36 are in sealing engagement with the inner surface of a peripheral wall 38 of the housing 32 to form and separate three combustion chambers 40 of variable volume between the rotor 34 and the housing 32. The peripheral wall 38 extends between two axially spaced apart end walls 54 to enclose the rotor cavity.

The rotor 34 is engaged to an eccentric portion 42 of the output shaft 16 to perform orbital revolutions within the rotor cavity. The output shaft 16 performs three rotations for each orbital revolution of the rotor 34. The geometrical axis 44 of the rotor 34 (and of the eccentric portion 42) is parallel to the axis 46 of the housing 32 (and of the shaft 16), and offset from it by a distance d. During each rotation of the rotor 34, each combustion chamber 40 varies in volume and moves around the rotor cavity to undergo the four phases of intake, compression, expansion and exhaust.

An intake port 48 is provided, for example through the peripheral wall 38, for admitting compressed air into one of the combustion chambers 40. An exhaust port 50 is also provided, for example through the peripheral wall 38, for discharge of the exhaust gases from the combustion chambers 40. Passages 52 for a spark plug, glow plug or other ignition source, as well as for one or more fuel injectors of a fuel injection system (not shown) are also provided, for example through the peripheral wall 38. Alternately, the intake port 48, the exhaust port 50 and/or the passages 52 may be provided through the end or side wall 54 of the housing. A subchamber (not shown) may be provided in communication with the combustion chambers 40, for pilot or pre injection of fuel for combustion, and the ignition mechanism may communicate with this subchamber.

For efficient operation the combustion chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors, communicate with a source 30 (see FIG. 1) of, in this embodiment, heavy fuel (e.g. diesel, kerosene (jet fuel), equivalent biofuel), and deliver the heavy fuel into the rotor assembly 11 such that the combustion chamber is stratified with a rich fuel-air mixture near the ignition source and a leaner mixture elsewhere. Alternately, the injectors can inject a mix of air and fuel.

Each combustion chamber 40 has a respective variable volume that is variable during the revolutions of the rotor 34, as the combustion chamber 40 rotates around the rotor cavity. The respective variable volume of the combustion chamber 40 increases during the intake phase, then decreases during the compression phase, then increases during the expansion phase, and then decreases during the exhaust phase. A variable working volume is defined for each combustion chamber 40, corresponding to a sum of the variable volume of the combustion chamber 40 and of the volume of cavity(ies) communicating with the combustion chamber, if present. Such cavities may include, for example, cavity(ies) defined in the rotor 34 and communicating with the combustion chamber, e.g. rotor recess 64 in the rotor flank 66, and/or cavity(ies) defined in the housing 32 and communicating with the combustion chamber 40, e.g. cavity(ies) in the peripheral wall 38 or end wall 54 of the housing 32, including, but not limited to, a pilot subchamber or other pilot cavity. In the present application, it is understood that the expression "volume of cavity(ies)" includes a value of zero (0) volume for such cavity(ies) when no such cavity(ies) is/are defined.

The volumetric ratios of the rotor assembly 11 are influenced by the respective variable working volume of the combustion chambers 40. Such volumetric ratios include a theoretical volumetric ratio $r_t$, an effective volumetric expansion ratio $r_{ef}$, and an effective volumetric compression ratio $r_{ec}$, all of which may affect the peak pressure (associated with a maximum threshold for the volumetric ratios), and/or capacity for the engine to start and/or to re-light (associated with a minimum threshold for the volumetric ratios). The volumetric ratios $r_t$, $r_{ef}$, $r_{ec}$ may also affect the power output of the rotor assembly 11.

The theoretical volumetric ratio $r_t$ of a combustion chamber 40 is defined by the ratio of its maximum working volume $V_{MAX}$ to its minimum working volume $V_{MIN}$ throughout the path of the revolution of the rotor 34 within the rotor cavity, i.e. the theoretical volumetric ratio is defined as $r_t = V_{MAX}/V_{MIN}$. In a typical rotor assembly, the rotor flanks 66 are identical, and the theoretical volumetric ratio $r_t$ is the same for all the combustion chambers 40 of a same rotor assembly 11. Other configurations are possible, as will be further detailed below.

The effective volumetric compression ratio $r_{ec}$ of a combustion chamber 40 is determined by the variation in its working volume during its compression phase, but also by the position of the inlet port 48. The effective volumetric compression ratio corresponds to $V_{c1}/V_{c2}$, where $V_{C1}$ is the working volume immediately after the inlet port 48 is closed (i.e., the maximum working volume during the portion of the compression phase where the inlet port 48 is closed), and $V_{C2}$ is the working volume at the end of the compression phase (i.e., the minimum working volume during the compression phase). The minimum working volume during the compression phase $V_{C2}$ may be equal to $V_{MIN}$, or may be not equal to $V_{MIN}$ for example when the housing 32 includes one or more cavity(ies) communicating with the combustion chamber 40 during the compression phase (examples of which are further detailed below).

In a particular embodiment, combustion chambers 40 having equal theoretical volumetric ratios $r_t$ but defined in rotor assemblies 11 having different positions for the inlet port 48 have unequal effective volumetric compression ratios $r_{ec}$, i.e. the effective volumetric compression ratio $r_{ec}$ of these combustion chambers 40 have different values from one another. In another particular embodiment, combustion chambers 40 having unequal theoretical volumetric ratios $r_t$ (i.e. theoretical volumetric ratios $r_t$ with different values from one another) and used with an inlet port 48 at the same position also have unequal effective volumetric compression ratios $r_{ec}$, whether the combustion chambers 40 are defined in a same or in different rotor assembly(ies) 11. Combustion chambers 40 with unequal effective volumetric compression ratios $r_{ec}$ can thus be obtained by having unequal theoretical volumetric ratios $r_t$, for combustion chambers 40 forming part of a same rotor assembly 11 or of different rotor assemblies 11, and/or with combustion chambers 40 of rotor assemblies 11 having different positions of the inlet port 48 from each other.

The effective volumetric expansion ratio $r_{ef}$ of a combustion chamber 40 is determined by the variation in its working volume during its expansion phase, but also by the position of the exhaust port 50. The effective volumetric expansion ratio $r_{ef}$ corresponds to $V_{E1}/V_{E2}$, where $V_{E1}$ is the working volume immediately before the exhaust port 50 is open (i.e., the maximum working volume during the portion of the expansion phase where the exhaust port is closed), and $V_{E2}$ is the working volume at the beginning of the expansion phase (i.e., the minimum working volume during the expansion phase). The minimum working volume during the expansion phase $V_{E2}$ may be equal to $V_{MIN}$, or may not be equal to $V_{MIN}$, for example when the housing 32 includes one or more cavity(ies) communicating with the combustion chamber 40 during the expansion phase (examples of which are further detailed below).

In a particular embodiment, two combustion chambers 40 having equal theoretical volumetric ratios $r_t$ but defined in rotor assemblies 11 having different positions for the exhaust port 50 have unequal effective volumetric expansion ratios $r_{ef}$, i.e. the effective volumetric expansion ratios $r_{ef}$ of the combustion chambers 40 have different values from one another. In another particular embodiment, combustion chambers 40 having unequal theoretical volumetric ratios $r_t$ and used with an exhaust port 50 at the same position also have unequal effective volumetric expansion ratios $r_{ef}$, whether the combustion chambers 40 are defined in a same or in different rotor assembly(ies) 11. Combustion chambers with unequal effective volumetric expansion ratios $r_{ef}$ can thus be obtained by having unequal theoretical volumetric ratios $r_t$, for combustion chambers 40 forming part of a same rotor assembly 11 or of different rotor assemblies 11, and/or with combustion chambers 40 of rotor assemblies 11 having different positions of the exhaust port 50 from each other.

Referring back to FIG. 2, in a particular embodiment, the engine 12 includes two or more rotor assemblies 11 which are configured so that at least one of the combustion chambers 40 of the first rotor assembly 11a and one of the combustion chambers 40 of the second rotor assembly 11b have unequal effective volumetric compression ratios $r_{ec}$ and/or unequal effective volumetric expansion ratios $r_{ef}$. In a particular embodiment, none of the combustion chambers 40 of the first rotor assembly 11a has the same effective volumetric compression ratio $r_{ec}$ and/or effective volumetric expansion ratio $r_{ef}$ as any of the combustion chambers 40 of the second rotor assembly 11b. It is understood that the particular rotor assemblies corresponding to the "first and second" rotor assemblies 11a, 11b could be any of the rotor assemblies of the engine 12 and are not limited to the particular assemblies shown in FIG. 2.

In a particular embodiment, one of the rotor assemblies 11 has combustion chamber(s) 40 with a higher effective volumetric compression ratio $r_{ec}$ than combustion chamber(s) 40 of the other rotor assembly(ies) 11 (e.g. $r_{ec}=8$ while combustion chamber(s) of the other rotor assembly(ies) 11 has/have an effective volumetric compression ratio $r_{ec}$ of 6; other values are also possible). The rotor assembly 11 with the higher effective volumetric compression ratio $r_{ec}$ may be configured for use during cold starting and to provide relight capability. The injection system of the rotor assembly with the higher volumetric compression ratio may include a different subchamber and/or injector size than that of the other rotor assembly(ies), for example to match the operating peak pressure and loading of the other rotor assemblies, especially at high power and/or to maximize the output density of the rotor assembly with the higher volumetric compression ratio.

For example, in a particular embodiment, the rotor assembly 11 shown in dotted lines is omitted, and the engine 12 includes three rotor assemblies 11, where two of the rotor assemblies 11b, 11c have an effective volumetric compression ratio $r_{ec}$ and/or effective volumetric expansion ratio $r_{ef}$ of 6 for all their combustion chambers 40, and the remaining rotor assembly 11a has an effective volumetric compression ratio $r_{ec}$ and/or effective volumetric expansion ratio $r_{ef}$ of 8 for all its combustion chambers 40. Other configurations and values are also possible.

Figure 4:
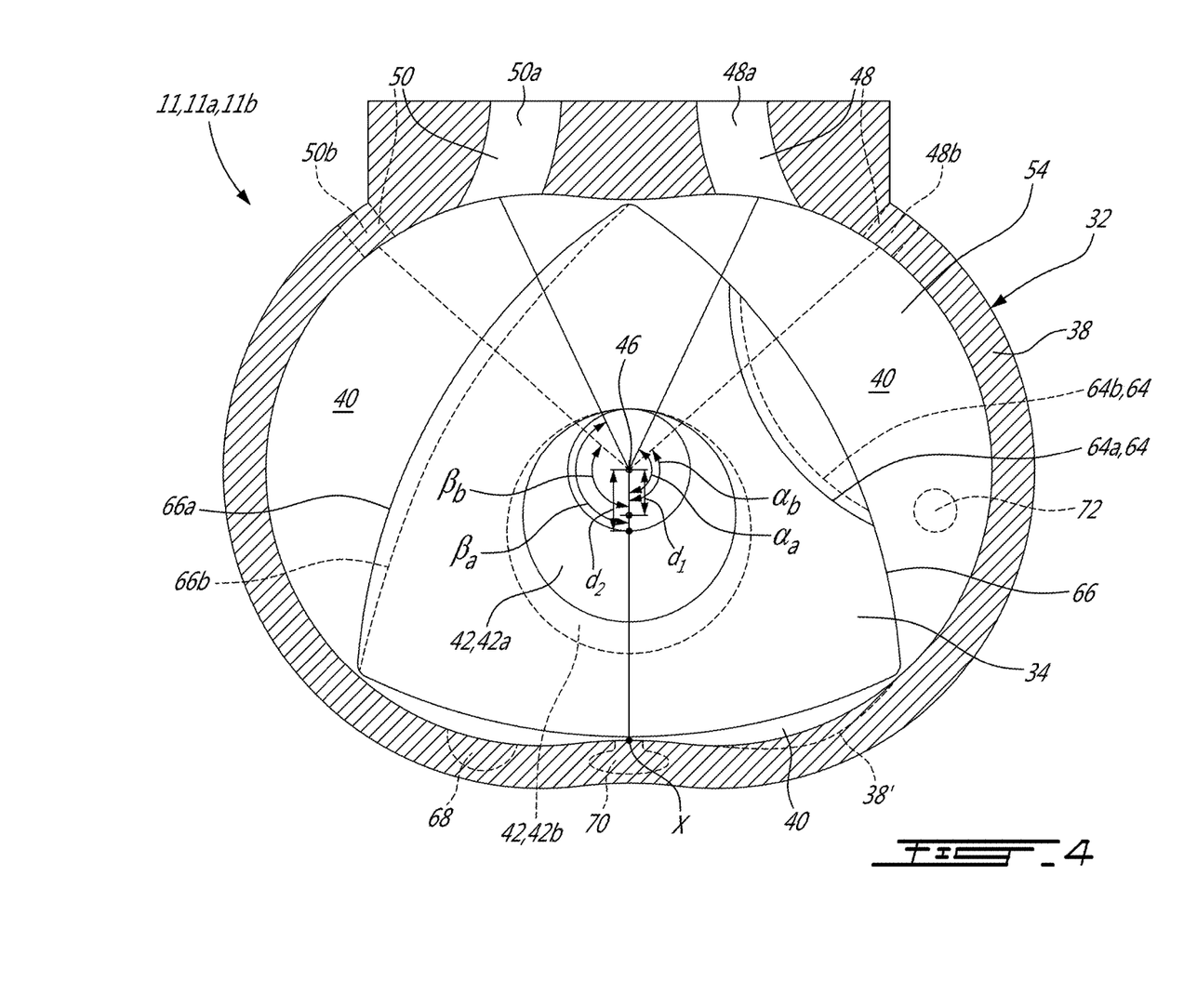
FIG. 4 is a schematic cross-sectional view of a rotor assembly showing different engine configurations which may be used to obtain different values for one or more volumetric ratio(s) of the rotor assembly.

Referring to FIG. 4, various examples of configurations allowing for two rotor assemblies 11a, 11b to have combustion chambers 40 with unequal effective volumetric compression ratios $r_{ec}$ and/or unequal effective volumetric expansion ratios $r_{ef}$ are shown, where the dotted lines show the variations between the two rotor assemblies 11a, 11b. It is understood that the configurations shown are exemplary only and that other suitable variations are also possible within the teachings herein.

In a particular embodiment, the rotor assemblies 11a, 11b have different positions for the inlet port 48 from each other, i.e. the angular offset $\alpha_a$ between the inlet port 48a and a given reference point X of the first rotor assembly 11a is not the same as the angular offset $\alpha_b$ between the inlet port 48b and the corresponding reference point X of the second rotor assembly 11b. The reference point X may be, for example, the intersection between the two lobes closest to the location of combustion (dead center location); any other reference point may be used, as long as corresponding reference points are used in all rotor assemblies 11, i.e. the reference points would overlap if the rotor assemblies 11 were positioned in alignment with the housings 32 having the same orientation.

For example, a number "$A_1$" of the combustion chambers 40 of the first rotor assembly 11a and a number "$B_1$" of the combustion chambers 40 of the second rotor assembly 11b have a same theoretical volumetric ratio $r_t$, where "$A_1$" and "$B_1$" can be one, some, or all of the combustion chambers 40 of the respective rotor assembly 11a, 11b. Because of the different positions of the inlet ports 48, the effective volumetric compression ratio $r_{ec}$ of the "$A_1$" combustion chamber(s) 40 of the first rotor assembly 11a is unequal to that of the "$B_1$" combustion chamber(s) 40 of the second rotor assembly 11b. In a particular embodiment, "$A_1$" and "$B_1$" correspond to all of the combustion chambers 40 of the respective rotor assembly 40. Other configurations are also possible.

In another particular embodiment, the rotor assemblies 11a, 11b have different positions for the exhaust port 50 from each other, i.e. the angular offset $\beta_a$ between the exhaust port 50a and the given reference point X of the first rotor assembly 11a is not the same as the angular offset $\beta_b$ between the exhaust port 50b and the given reference point X of the second rotor assembly 11b. For example, a number "$A_2$" of the combustion chambers 40 of the first rotor assembly 11a and a number "$B_2$" of the combustion chambers 40 of the second rotor assembly 11b have a same theoretical volumetric ratio $r_t$, where "$A_2$" and "$B_2$" can be one, some, or all of the combustion chambers 40 of the respective rotor assembly 11a, 11b. Because of the different positions of the exhaust ports 50, the effective volumetric expansion ratio $r_{ef}$ of the "$A_2$" combustion chamber(s) 40 of the first rotor assembly 11a is unequal to that of the "$B_2$"

combustion chamber(s) 40 of the second rotor assembly 11b. In a particular embodiment, "$A_2$" and "$B_2$" correspond to all of the combustion chambers 40 of the respective rotor assembly 11a, 11b. Other configurations are also possible.

In another particular embodiment, the two rotor assemblies 11a, 11b can have different positions from each other both for the inlet ports 48 and for the exhaust ports 50. For example, a number "$A_3$" of the combustion chambers 40 of the first rotor assembly 11a and a number "$B_3$" of the combustion chambers 40 of the second rotor assembly 11b have a same theoretical volumetric ratio $r_t$, where "$A_3$" and "$B_3$" can be one, some, or all of the combustion chambers 40 of the respective rotor assembly 11a, 11b. Because of the different positions of the inlet ports 48 and of the different positions of the exhaust ports 50, the effective volumetric compression ratio $r_{ec}$ of the "$A_3$" combustion chamber(s) 40 of the first rotor assembly 11a is unequal to that of the "$B_3$" combustion chamber(s) 40 of the second rotor assembly 11b, and the effective volumetric expansion ratio $r_{ef}$ of the "$A_3$" combustion chamber(s) 40 of the first rotor assembly 11a is unequal to that of the "$B_3$" combustion chamber(s) 40 of the second rotor assembly 11b. In a particular embodiment, "$A_3$" and "$B_3$" correspond to all of the combustion chambers 40 of the respective rotor assembly 11a, 11b. Other configurations are also possible.

It is understood that the effective volumetric compression ratio $r_{ec}$ of a given combustion chamber 40 may differ from its effective volumetric expansion ratio $r_{ef}$, depending on the relative position of the inlet port 48 and exhaust port 50.

In another particular embodiment, the two rotor assemblies 11a, 11b define unequal theoretical volumetric ratio $r_t$, i.e. a number "$A_4$" of the combustion chambers 40 of the first rotor assembly 11a has/have a first theoretical volumetric ratio $r_t$, and a number "$B_4$" of the combustion chambers 40 of the second rotor assembly 11b has/have a second theoretical volumetric ratio $r_t$ unequal to the first theoretical volumetric ratio $r_t$, where "$A_4$" and "$B_4$" can be one, some, or all of the combustion chambers 40 of the respective rotor assembly 11a, 11b. In a particular embodiment, "$A_4$" and "$B_4$" correspond to all of the combustion chambers 40 of the respective rotor assembly 11a, 11b. The effective volumetric compression ratio $r_{ec}$ of the "$A_4$" combustion chamber(s) of the first rotor assembly 11a may not be the same as that of the "$B_4$" combustion chamber(s) of the second rotor assembly 11b, and/or the effective volumetric expansion ratio $r_{ef}$ of the "$A_4$" combustion chamber(s) 40 of the first rotor assembly 11a may not be the same as that of the "$B_4$" combustion chamber(s) 40 of the second rotor assembly 11a, depending on the relative positions of the inlet and exhaust ports 48, 50. It is understood that combustion chambers 40 of different rotor assemblies 11 having unequal theoretical volumetric ratios $r_t$ can be used with rotor assemblies having different inlet port 48 positions and/or different exhaust port 50 positions, and with rotor assemblies 11 having the same position as each other for the inlet port 48 and the same position as each other for the exhaust port 50.

In order to have unequal theoretical volumetric ratios $r_t$, the "$A_4$" combustion chamber(s) of the first rotor assembly 11a have a minimum and/or maximum working volume unequal to that of the "$B_4$" combustion chamber(s) of the second rotor assembly 11b; this can be due to differences between the rotors 34 and/or the housings 32 of the two rotor assemblies 11a, 11b. Differences between the housings 32 of two rotor assemblies 11a, 11b can be used to obtain a difference in minimum and/or maximum working volume, and accordingly in theoretical volumetric ratio $r_t$, between all of the chambers 40 of the first rotor assembly 11a and all of the chambers 40 of the second rotor assembly 11b, so that all of the combustion chambers 40 of the first rotor assembly 11a have a respective theoretical volumetric ratio $r_t$ unequal to that of any of the combustion chambers 40 of the second rotor assembly 11b. Differences between the rotors 34 of two rotor assemblies 11a, 11b can be used to obtain a difference in minimum and/or maximum working volume, and accordingly in theoretical volumetric ratio $r_t$, between one, some, or all of the chambers 40 of the first rotor assembly 11a and one, some, or all of the chambers 40 of the second rotor assembly 11b, so that one, some, or all of the combustion chambers 40 of the first rotor assembly 11a have a respective theoretical volumetric ratio $r_t$ unequal to that of one, some, or all of the combustion chambers 40 of the second rotor assembly 11b.

Still referring to FIG. 4, in a particular embodiment the rotor 34 of at least one of the rotor assemblies 11a, 11b includes in one, some or all of the flanks 66 a recess 64 defined in the peripheral rotor face, or any other cavity defined in the rotor 34 and communicating with one or more of the combustion chambers 40. For example, the "$A_4$" combustion chamber(s) of the first rotor assembly 11a correspond to a respective flank having a recess 64a and/or communicate with any other rotor cavity, and the "$B_4$" combustion chamber(s) of the second rotor assembly 11b correspond to a respective flank having a recess 64b and/or communicate with any other rotor cavity; alternately, the "$A_4$" or the "$B_4$" combustion chamber(s) may correspond to a respective flank without a recess or rotor cavity communicating therewith (i.e. with a recess/rotor cavity volume at zero). The minimum and/or maximum working volume of the "$A_4$" combustion chamber(s) of the first rotor assembly 11a respectively differ from the minimum and/or maximum working volume of the "$B_4$" combustion chamber(s) of the second rotor assembly 11b by having the volume of the recess 64a/rotor cavity unequal to the volume of the recess 64b/rotor cavity. This difference in working volume between the two rotor assemblies 11a, 11b thus allow for the "$A_4$" combustion chamber(s) of the first rotor assembly 11a to have a theoretical volumetric ratio $r_t$ unequal to that of the "$B_4$" combustion chamber(s) of the second rotor assembly 11b. The difference in working volume produced by the difference in recess/rotor cavity volume can also be used to define unequal effective volumetric compression ratios $r_{ec}$ and/or unequal effective volumetric expansion ratios $r_{ef}$ between the "$A_4$" combustion chamber(s) of the first rotor assembly 11a and the "$B_4$" combustion chamber(s) of the second rotor assembly 11b.

In another particular embodiment the rotors 34 of the two rotor assemblies 11a, 11b have different peripheral shapes from each other, so as to obtain unequal volumes for their combustion chambers 40. This difference in shape can be applied to one, only some, or all of the flanks 66 of the rotors 34. For example, the "$A_4$" combustion chamber(s) of the first rotor assembly 11a correspond to a respective flank 66a and the "$B_4$" combustion chamber(s) of the second rotor assembly 11b correspond to a respective flank 66b, with the flanks 66a, 66b having different shapes from each other. The minimum and maximum working volumes of the "$A_4$" combustion chamber(s) of the first rotor assembly 11a respectively differ from the minimum and maximum working volumes of the "$B_4$" combustion chamber(s) of the second rotor assembly 11b by having the shape of the flank 66a being different from the shape of the flank 66b. This difference in working volume between the two rotor assemblies 11a, 11b thus allow for the "$A_4$" combustion chamber(s) of the first rotor assembly 11a to have a theoretical volumetric ratio $r_t$ unequal to that of the "$B_4$" combustion chamber(s) of the second rotor assembly 11b. The difference in working volume produced by the difference in flank shape can also be used to define unequal effective volumetric compression ratios $r_{ec}$ and/or unequal effective volumetric expansion ratios $r_{ef}$ between the "$A_4$" combustion chamber(s) of the first rotor assembly 11a and the "$B_4$" combustion chamber(s) of the second rotor assembly 11b.

In another particular embodiment the rotors 34 of the two rotor assemblies 11a, 11b are engaged to eccentric shaft portions 42a, 44b which are different from each other. The central axis 44a of the eccentric shaft portion 42a of the first rotor assembly 11a is offset from the central axis 46 of the engine shaft 16 by a distance $d_1$ unequal to the distance $d_2$ between the central axis 44b of the eccentric shaft portion 42b of the second rotor assembly 11b and the central axis 46 of the engine shaft 46, i.e. the offset of the rotors 34 of the two rotor assemblies 11a, 11b are different from each other. This difference in rotor offset affects the working volume of all of the combustion chambers 40 of the rotor assemblies 11a, 11b, so that the minimum and maximum working volumes of the combustion chambers 40 of the first rotor assembly 11a respectively differ from the minimum and maximum working volumes of the combustion chambers 40 of the second rotor assembly 11b. This difference in working volume between the two rotor assemblies 11a, 11b thus defines unequal theoretical volumetric ratios $r_t$ between the combustion chambers 40 of the first rotor assembly 11a and the combustion chambers 40 of the second rotor assembly 11b. The difference in working volume produced by the difference in rotor offset can also be used to define unequal effective volumetric compression ratios $r_{ec}$ and/or unequal effective volumetric expansion ratios $r_{ef}$ between the combustion chambers 40 of the first rotor assembly 11a and the combustion chambers 40 of the second rotor assembly 11b.

In another particular embodiment, the housing 32 of at least one of the rotor assemblies 11a, 11b includes one or more cavity(ies) in successive communication with the combustion chambers 40; examples of such cavities are shown at 68, 70, 72, and may be defined in the peripheral wall 38 (cavities 68, 70) and/or in the end wall 54 (cavity 72). The volume of the housing cavity(ies) 68, 70, 72 (which can be zero when no such cavity(ies) 68, 70, 72 are provided) of the first rotor assembly 11a is unequal to that of the second rotor assembly 11b. This difference in housing cavity volume affects the working volume of all of the combustion chambers 40 of the rotor assemblies 11a, 11b, so that the minimum and/or maximum working volume of the combustion chambers 40 of the first rotor assembly 11a respectively differs from the minimum and/or maximum working volume of the combustion chambers 40 of the second rotor assembly 11b. This difference in working volume between the two rotor assemblies 11a, 11b thus defines unequal theoretical volumetric ratios $r_t$ between the combustion chambers 40 of the first rotor assembly 11a and the combustion chambers 40 of the second rotor assembly 11b. If the cavity(ies) communicate(s) with the combustion chambers 40 during the compression phase of the cycle (e.g. cavity 72), the difference in housing cavity volume may define unequal effective volumetric compression ratios $r_{ec}$ between the combustion chambers 40 of the first rotor assembly 11a and the combustion chambers 40 of the second rotor assembly 11b. If the cavity(ies) communicate(s) with the combustion chambers 40 during the expansion phase of the cycle (e.g. cavity 68), the difference in housing cavity volume may define unequal effective volumetric expansion ratios $r_{ef}$ between the combustion chambers 40 of the first rotor assembly 11a and the combustion chambers 40 of the second rotor assembly 11b.

In another particular embodiment, the shape of the rotor cavity of the first rotor assembly 11a is different from that of the rotor cavity of the second rotor assembly 11b. For example, the peripheral shape of the two rotor cavities, i.e. the shape of the peripheral walls 38, 38' of the two rotor assemblies 11a, 11b, can be different from each other. This difference in rotor cavity shape affects the working volume of all of the combustion chambers 40 of the rotor assemblies 11a, 11b, so that the minimum and/or maximum working volume of the combustion chambers 40 of the first rotor assembly 11a respectively differs from the minimum and/or maximum working volume of the combustion chambers 40 of the second rotor assembly 11b. This difference in working volume between the two rotor assemblies 11a, 11b thus defines unequal theoretical volumetric ratios $r_t$ between the combustion chambers 40 of the first rotor assembly 11a and the combustion chambers 40 of the second rotor assembly 11b. If the difference in rotor cavity profile is located in the compression phase of the cycle, the difference in rotor cavity profile may define unequal effective volumetric compression ratios $r_{ec}$ between the combustion chambers 40 of the first rotor assembly 11a and the combustion chambers 40 of the second rotor assembly 11b. If the difference in rotor cavity profile is located in the expansion phase of the cycle, the difference in rotor cavity profile may define unequal effective volumetric expansion ratios $r_{ef}$ between the combustion chambers 40 of the first rotor assembly 11a and the combustion chambers 40 of the second rotor assembly 11b.

In another particular embodiment, a same rotor assembly 11 is configured so as to have at least two of its combustion chambers 40 with unequal effective volumetric compression ratios $r_{ec}$ and unequal effective volumetric expansion ratios $r_{ef}$, by having unequal theoretical volumetric ratios $r_t$ for these combustion chambers 40. For example, the rotor assembly 11 may have two combustion chambers 40 having the same theoretical volumetric ratio $r_t$ (and, accordingly, the same effective volumetric compression ratio $r_{ec}$, and the same effective volumetric expansion ratios $r_{ef}$, where the effective volumetric compression and expansion ratios $r_{ef}$, $r_{ec}$ may or may not be equal to one another), and a third combustion chamber 40 having a theoretical volumetric ratio $r_t$ unequal to that of the other two combustion chambers 40 (and, accordingly, an effective volumetric compression ratio $r_{ec}$ unequal to that of the other two combustion chambers 40, and an effective volumetric expansion ratio $r_{ef}$ unequal to that of the other two combustion chambers 40). In another example, the rotor assembly 11 has three combustion chambers with unequal theoretical volumetric ratios $r_t$ (i.e. three different values)—and, accordingly, unequal effective volumetric compression ratios $r_{ec}$ and unequal volumetric expansion ratios $r_{ef}$. This may allow, for example, to have at least one combustion chamber 40 with a lower effective volumetric compression ratio $r_{ec}$ more suitable for peak pressures, and at least one combustion chamber 40 with a higher effective volumetric compression ratio $r_{ec}$ more suitable for start-up conditions; the higher and lower effective volumetric compression ratio $r_{ec}$ may be respectively higher and lower than the "mean" effective volumetric compression ratio $r_{ec}$ that would be suitable to accommodate the two conflicting requirements in a "standard" rotor assembly having the same effective volumetric compression ratio $r_{ec}$ in all combustion chambers.

In a particular embodiment, the rotor assembly 11 has combustion chambers 40 with an effective volumetric compression and/or expansion ratio $r_{ec}$, $r_{ef}$ having a first value for the first combustion chamber (e.g., $r_{ec}$=8.0 and/or $r_{ef}$=8.0), a second value for the second combustion chamber (e.g., $r_{ec}$=8.2 and/or $r_{ef}$=8.2), and a third value for the third combustion chamber (e.g., $r_{ec}$=7.8 and/or $r_{ef}$=7.8). In another particular embodiment, the rotor assembly has combustion chambers 40 with an effective volumetric compression and/or expansion ratio $r_{ec}$, $r_{ef}$ having a first value for the first combustion chamber (e.g., $r_{ec}$=7.8 and/or $r_{ef}$=7.8), and a second value for the other two combustion chambers (e.g., $r_{ec}$=8.0 and/or $r_{ef}$=8.0). Other values, including greater differences between the combustion chambers 40, are also possible.

The rotor assembly 11 having combustion chambers 40 with unequal volumetric ratios $r_t$, $r_{ef}$, $r_{ec}$ may be used in an engine 12 including a single rotor assembly 11, or in an engine 12 including multiple rotor assemblies 11, whether this engine 12 is part of a compound engine assembly 10, part of any other suitable engine assembly, or used alone. In an engine with multiple rotor assemblies 11, all the rotor assemblies 11 may be configured with the same distribution of volumetric ratios $r_t$, $r_{ef}$, $r_{ec}$ for their combustion chambers 40, or with different distributions of the volumetric ratios $r_t$, $r_{ef}$, $r_{ec}$. For example, each rotor assembly 11 could have one combustion chamber 40 having a theoretical volumetric ratio $r_t$ unequal to that of the other combustion chambers 40 of the rotor assembly 11, with the rotor assemblies 11 being configured similarly to each other, or configured differently from each other e.g. with combustion chambers of different ones of the rotor assemblies having unequal effective volumetric compression ratios $r_{ec}$ and/or unequal effective volumetric expansion ratios $r_{ef}$. In another example, a single one of the rotor assemblies could have combustion chambers 40 with unequal theoretical volumetric ratios $r_t$ while the other rotor assembly/ies 11 of the engine 12 each have combustion chambers 40 with equal theoretical volumetric ratios $r_t$.

Unequal theoretical volumetric ratios $r_t$, and accordingly unequal effective volumetric compression ratios $r_{ec}$ and unequal effective volumetric expansion ratios $r_{ef}$ between combustion chambers 40 of a same rotor assembly 11 can be obtained through any configuration allowing for the combustion chambers 40 to have unequal minimum and/or maximum working volumes. As detailed above, the unequal working volumes of combustion chambers 40 of the same rotor assembly 11 can be obtained by defining unequal volumes for recess(es) 64, 64a, 64b of the rotor flanks 66 (including defining a volume of zero, i.e. omitting the recess), by defining unequal volumes for any other cavity of the rotor 34 which communicates with only one or some of the combustion chambers 40 without communicating with the other(s) (including defining a volume of zero, i.e. omitting such cavity), and/or by having different shapes for the rotor flanks 66, 66a, 66b defining the working chambers 40. For example, the shape of the rotor flank 66 defining one, some or all of the combustion chambers 40 can vary from that of the typical trochoid shape used in a Wankel engine.

In a particular embodiment, the rotor assembly 11 with combustion chambers 40 having unequal theoretical volumetric ratios $r_t$, unequal effective volumetric compression ratios $r_{ec}$ and unequal effective volumetric expansion ratios $r_{ef}$, and the engine 12 with combustion chambers of different rotor assemblies 11 having unequal theoretical volumetric ratios $r_t$, unequal effective volumetric compression ratios $r_{ec}$ and/or unequal effective volumetric expansion ratios $r_{ef}$ allow to accommodate the conflicting requirements of limiting peak pressure during maximum load while providing adequate relight capability, for example by providing at least two different effective volumetric compression ratios $r_{ec}$ and/or effective volumetric expansion ratios $r_{ef}$ each tailored for one of these requirements. In a particular embodiment, the relight capability, which is particularly important for aircraft engine applications where starting capability must be demonstrated at adverse conditions of high altitudes (low pressure) and cold ambient temperatures, can thus be provided with minimal impact on the performance of the engine at maximum load.

It is understood that any one or any combination of the rotor assembly configurations described herein can be used to obtain a rotor assembly having one or more combustion chamber(s) with a theoretical volumetric ratio $r_t$, an effective volumetric compression ratio $r_{ec}$ and/or an effective volumetric expansion ratio $r_{ef}$ having a particular value. For example, the working volume of one, some, or all of the combustion chambers of a rotor assembly can be selected to define a desired value for the theoretical volumetric ratio $r_t$, by selecting a particular volume for the corresponding flank recess(es), for other rotor cavity(ies) communicating with the combustion chamber(s) and/or for the housing cavity(ies) communicating with the combustion chamber(s); and/or by selecting a particular peripheral shape for the rotor and/or the rotor cavity; and/or by selecting a particular distance between the central axes of the eccentric shaft portion and of the engine shaft. The position of the inlet and exhaust ports 48, 50 can be determined by the desired effective volumetric compression ratio $r_{ec}$ and effective volumetric expansion ratio $r_{ef}$ for the combustion chamber 40.

In a particular embodiment, any one or any combination of the rotor assembly configurations described herein is used to obtain a rotor assembly having one, some, or all of its combustion chambers defining a theoretical volumetric ratio $r_t$ corresponding to any of the following values: 8.2 or less; 8 or less; 7.8 or less; 7.5 or less; 7.2 or less; 6.5 or less; 5.5 or less; about 8.2; about 8; about 7.5; about 7.8; about 7.2; about 6.5; about 5.5; about 5; from 5 to 8.2, to 8, to 7.8, to 7.5, to 7.2, to 6.5 or to 5.5; from 5.5 to 8.2, to 8, to 7.8, to 7.5, to 7.2, or to 6.5; from 6.5 to 8.2, to 8, to 7.8, to 7.5, or to 7.2; from 7.2 to 8.2, to 8, to 7.8, or to 7.5; from 7.5 to 8.2, to 8 or to 7.8; from 7.8 to 8.2 or to 8; from 8 to 8.2.

In a particular embodiment, any one or any combination of the rotor assembly configurations described herein is used to obtain a rotor assembly having one, some, or all of its combustion chambers defining an effective volumetric compression ratio $r_{ec}$ corresponding to any of the following values: 8.2 or less; 8 or less; 7.8 or less; 7.5 or less; 7.2 or less; 6.5 or less; 5.5 or less; about 8.2; about 8; about 7.5; about 7.8; about 7.2; about 6.5; about 5.5; about 5; from 5 to 8.2, to 8, to 7.8, to 7.5, to 7.2, to 6.5 or to 5.5; from 5.5 to 8.2, to 8, to 7.8, to 7.5, to 7.2, or to 6.5; from 6.5 to 8.2, to 8, to 7.8, to 7.5, or to 7.2; from 7.2 to 8.2, to 8, to 7.8, or to 7.5; from 7.5 to 8.2, to 8 or to 7.8; from 7.8 to 8.2 or to 8; from 8 to 8.2.

In a particular embodiment, any one or any combination of the rotor assembly configurations described herein is used to obtain a rotor assembly having one, some, or all of its combustion chambers defining an effective volumetric expansion ratio $r_{ef}$ corresponding to any of the following values: 8.2 or less; 8 or less; 7.8 or less; 7.5 or less; 7.2 or less; 6.5 or less; 5.5 or less; about 8.2; about 8; about 7.5; about 7.8; about 7.2; about 6.5; about 5.5; about 5; from 5 to 8.2, to 8, to 7.8, to 7.5, to 7.2, to 6.5 or to 5.5; from 5.5 to 8.2, to 8, to 7.8, to 7.5, to 7.2, or to 6.5; from 6.5 to 8.2, to 8, to 7.8, to 7.5, or to 7.2; from 7.2 to 8.2, to 8, to 7.8, or to 7.5; from 7.5 to 8.2, to 8 or to 7.8; from 7.8 to 8.2 or to 8; from 8 to 8.2.

The above description is meant to be exemplary only, and one skilled in the art will recognize that changes may be made to the embodiments described without departing from the scope of the invention disclosed. For example, it is understood that the various examples of rotor and/or housing configurations can be combined to obtain unequal effective volumetric compression ratios $r_{ec}$ and/or unequal effective volumetric expansion ratios $r_{ef}$ for combustion chambers of a same rotor assembly or of different rotor assemblies. Other modifications which fall within the scope of the present invention will be apparent to those skilled in the art, in light of a review of this disclosure, and such modifications are intended to fall within the appended claims.

The invention claimed is:

1. A rotary internal combustion engine comprising:
a housing having a rotor cavity; and
a rotor received in the rotor cavity and cooperating with the housing to define combustion chambers in the rotor cavity, each of the combustion chambers having a respective working volume that is variable, each of the combustion chambers having a theoretical volumetric ratio defined as a ratio of a maximum value of the respective working volume to a minimum value of the respective working volume throughout one revolution of the rotor, wherein at least a first and a second of the combustion chambers have unequal theoretical volumetric ratios.

2. The rotary internal combustion engine as defined in claim 1, wherein the theoretical volumetric ratio of a third of the combustion chambers is unequal to the theoretical volumetric ratios of the first and second combustion chambers.

3. The rotary internal combustion engine as defined in claim 1, wherein the first combustion chamber is bordered by a first flank of the rotor and the second combustion chamber is bordered by a second flank of the rotor, the first flank including a recess having a volume unequal to that of a recess of the second flank.

4. The rotary internal combustion engine as defined in claim 1, wherein the first combustion chamber is bordered by a first flank of the rotor and the second combustion chamber is bordered by a second flank of the rotor, the first flank including a recess, the second flank being free of recesses.

5. The rotary internal combustion engine as defined in claim 1, wherein the first combustion chamber is bordered by a first flank of the rotor and the second combustion chamber is bordered by a second flank of the rotor, the first and second flanks having different shapes from each other.

6. The rotary internal combustion engine as defined in claim 1, wherein the rotary internal combustion engine is a Wankel engine, the rotor cavity having an epitrochoid shape with two lobes, the rotor having a generally triangular profile defined by three circumferentially-spaced apex portions.

7. A rotary internal combustion engine comprising:
an engine shaft;
at least first and second rotor assemblies each including:
a housing having a rotor cavity and having an inlet port and an exhaust port in communication with the rotor cavity, and
a rotor engaged to the engine shaft and received in the rotor cavity, the rotor cooperating with the housing to define combustion chambers in the rotor cavity, each of the combustion chambers having a respective working volume, each of the combustion chambers having an effective volumetric compression ratio determined by a first variation in the respective working volume during a compression phase of the combustion chamber and by a position of the inlet port, and an effective volumetric expansion ratio determined by a second variation in the respective working volume during an expansion phase of the combustion chamber and by a position of the exhaust port;
wherein at least one of the combustion chambers of the first rotor assembly and at least one of the combustion chambers of the second rotor assembly have one or both of unequal effective volumetric compression ratios and unequal effective volumetric expansion ratios.

8. The rotary internal combustion engine as defined in claim 7, wherein an angular offset between the inlet port of the first rotor assembly and a reference point of the first rotor assembly is different from an angular offset between the inlet port of the second rotor assembly and a corresponding reference point of the second rotor assembly.

9. The rotary internal combustion engine as defined in claim 7, wherein an angular offset between the exhaust port of the first rotor assembly and a reference point of the first rotor assembly is different from an angular offset between the exhaust port of the second rotor assembly and a corresponding reference point of the second rotor assembly.

10. The rotary internal combustion engine as defined in claim 7, wherein the effective volumetric compression ratio of each of the combustion chambers of the first rotor assembly is unequal to the effective volumetric compression ratio of any of the combustion chambers of the second rotor assembly.

11. The rotary internal combustion engine as defined in claim 7, wherein the effective volumetric expansion ratio of each of the combustion chambers of the first rotor assembly is unequal to the effective volumetric expansion ratio of any of the combustion chambers of the second rotor assembly.

12. The rotary internal combustion engine as defined in claim 7, wherein each of the combustion chambers has a theoretical volumetric ratio defined as a ratio of a maximum value of the respective working volume to a minimum value of the respective working volume throughout one revolution of the rotor, and wherein the at least one of the combustion chambers of the first rotor assembly and the at least one of the combustion chambers of the second rotor assembly have unequal theoretical volumetric ratios.

13. The rotary internal combustion engine as defined in claim 12, wherein at least a first and a second of the combustion chambers of the first rotor assembly have unequal theoretical volumetric ratios.

14. The rotary internal combustion engine as defined in claim 7, wherein the rotor of the first rotor assembly has at least one flank including a first recess defined therein, the rotor of the second rotor assembly has at least one flank including a second recess defined therein, the first recess having a volume unequal to that of the second recess.

15. The rotary internal combustion engine as defined in claim 7, wherein the rotor of the first rotor assembly has at least one flank including a first recess defined therein, the rotor of the second rotor assembly having flanks free of recesses defined therein.

16. The rotary internal combustion engine as defined in claim 7, wherein the rotor of the first rotor assembly has a different peripheral shape from that of the rotor of the second rotor assembly.

17. The rotary internal combustion engine as defined in claim 7, wherein the rotor cavity of the first rotor assembly has a different peripheral shape from that of the rotor cavity of the second rotor assembly.

18. The rotary internal combustion engine as defined in claim 7, wherein a first eccentric portion of the engine shaft engaging the rotor of the first rotor assembly has a central axis offset from a central axis of the engine shaft by a first distance, and a second eccentric portion of the engine shaft engaging the rotor of the second rotor assembly has a central axis offset from the central axis of the engine shaft by a second distance unequal to the first distance.

19. The rotary internal combustion engine as defined in claim 7, wherein the housing of the first rotor assembly has at least one first cavity in successive communication with the combustion chambers of the first rotor assembly, the housing of the second rotor assembly has at least one second cavity in successive communication with the combustion chambers of the second rotor assembly, the at least one first cavity having a volume unequal to that of the at least one second cavity.

20. The rotary internal combustion engine as defined in claim 7, wherein the first and second rotor assemblies are Wankel engines, each of the rotor cavity having an epitrochoid shape with two lobes, each of the rotor having a generally triangular profile defined by three circumferentially-spaced apex portions.

* * * * *